United States Patent
Liu et al.

(10) Patent No.: US 12,521,659 B2
(45) Date of Patent: Jan. 13, 2026

(54) NANOPOROUS METAL FOAM GAS AND FLUID FILTERS

(71) Applicant: Georgetown University, Washington, DC (US)

(72) Inventors: Kai Liu, Falls Church, VA (US); James D. Malloy, Arlington, VA (US)

(73) Assignee: Georgetown University, Washington, DC (US)

( * ) Notice: Subject to any disclaimer, the term of this patent is extended or adjusted under 35 U.S.C. 154(b) by 0 days.

(21) Appl. No.: 17/244,796

(22) Filed: Apr. 29, 2021

(65) Prior Publication Data

US 2021/0322909 A1    Oct. 21, 2021

Related U.S. Application Data

(63) Continuation-in-part of application No. 16/582,123, filed on Sep. 25, 2019, now Pat. No. 12,403,418, (Continued)

(51) Int. Cl.
*B01D 39/00* (2006.01)
*B01D 39/10* (2006.01)
(Continued)

(52) U.S. Cl.
CPC ......... *B01D 39/2051* (2013.01); *B01D 39/10* (2013.01); *B01D 46/0001* (2013.01); (Continued)

(58) Field of Classification Search
CPC .. B01D 39/2051; B01D 39/10; B01D 46/645; B01D 46/0001; B01D 46/0032; (Continued)

(56) References Cited

U.S. PATENT DOCUMENTS 6,080,219 A * 6/2000 Jha ..................... B01D 39/2093
55/486
9,784,802 B1 * 10/2017 Cox ...................... G01D 5/145
(Continued)

FOREIGN PATENT DOCUMENTS

CA          2152644 A  *  1/1996  ............... C22C 1/08
WO    WO-2019163256 A1 *  8/2019  ............. C22C 19/03

OTHER PUBLICATIONS

Final Office Action released by the U.S. Patent & Trademark Office on May 31, 2024 for corresponding U.S. Appl. No. 16/582,123; 29 pages.

*Primary Examiner* — T. Bennett McKenzie
(74) *Attorney, Agent, or Firm* — Smith Gambrell & Russell LLP

(57) ABSTRACT

A metal foam-based filtration system and method for removing sub-micron particles and contaminants from a gas or fluid flow with the use of ultralow density metal nanowire meshes that have nanometer to micron scale pores for trapping air/fluid-borne particulates. Filters can use metal foams and coated metal foams alone or in tandem. The size and density of pores in the foam can be adjusted with synthesis conditions. Foams with pore size gradients promote the trapping of different sized particulates at different regions of a foam. Multiple rounds of electrodeposition may be applied to increase the surface area and curvature of a nanowire mesh and strengthen the mesh to make it self-supporting, free-standing and capable of supporting a much heavier mass without collapse. A metal and/or a coated metal foam can act as a catalyst or substrate for absorption or adsorption to capture target particles and/or contaminants.

9 Claims, 5 Drawing Sheets

Related U.S. Application Data which is a continuation of application No. PCT/US2018/026343, filed on Apr. 5, 2018.

(60) Provisional application No. 63/165,026, filed on Mar. 23, 2021, provisional application No. 62/482,594, filed on Apr. 6, 2017.

(51) Int. Cl.

| | | |
|---|---|---|
| *B01D 39/20* | (2006.01) | |
| *B01D 46/00* | (2022.01) | |
| *B01D 46/62* | (2022.01) | |
| *C25D 1/00* | (2006.01) | |
| *C25D 1/04* | (2006.01) | |
| *C25D 1/08* | (2006.01) | |
| *C25D 7/06* | (2006.01) | |

(52) U.S. Cl.
CPC ....... *B01D 46/0032* (2013.01); *B01D 46/645* (2022.01); *C25D 1/006* (2013.01); *C25D 1/04* (2013.01); *C25D 1/08* (2013.01); *C25D 7/0607* (2013.01); *B01D 2239/0478* (2013.01); *B01D 2239/10* (2013.01); *B01D 2239/1216* (2013.01)

(58) Field of Classification Search
CPC ........ B01D 2239/0478; B01D 2239/10; B01D 2239/1216; B01D 2239/025; C25D 1/006; C25D 1/04; C25D 1/08; C25D 7/0607; C25D 5/10; C25D 1/00; C25D 3/38; C25D 3/50; C25D 7/00
USPC .......................................................... 55/525
See application file for complete search history.

(56) References Cited

U.S. PATENT DOCUMENTS

| | | | |
|---|---|---|---|
| 2004/0129140 A1 | 7/2004 | Park | |
| 2007/0028767 A1 | 2/2007 | Choi | |
| 2008/0028936 A1 | 2/2008 | Takahashi | |
| 2009/0143227 A1 | 6/2009 | Dubrow | |
| 2010/0050866 A1 | 3/2010 | Yu | |
| 2011/0281174 A1* | 11/2011 | Seymour ............... | H01M 4/366 |
| | | | 429/207 |
| 2015/0068974 A1 | 3/2015 | Kong | |
| 2015/0099199 A1* | 4/2015 | Bazant .................... | H01M 8/20 |
| | | | 429/495 |
| 2016/0101398 A1* | 4/2016 | Worsley ............... | B01J 13/0091 |
| | | | 427/372.2 |
| 2018/0311737 A1 | 11/2018 | Burks | |
| 2019/0010627 A1* | 1/2019 | Zhan ......................... | C25F 3/02 |
| 2019/0085478 A1* | 3/2019 | Burks .................. | C25D 11/045 |
| 2020/0086257 A1* | 3/2020 | Liu ......................... | B01D 46/60 |
| 2020/0377973 A1* | 12/2020 | Okuno .................... | C22C 19/03 |

\* cited by examiner

NANOPOROUS METAL FOAM GAS AND FLUID FILTERS

CROSS-REFERENCE TO RELATED APPLICATIONS

This application claims priority to and is a continuation-in-part of U.S. patent application Ser. No. 16/582,123 (the '123 application). This application also claims priority to U.S. provisional patent application No. 63/165,026 filed on Mar. 23, 2021. The '123 application claims priority to, and is a 35 U.S.C. § 111(a) continuation of, PCT international patent application number PCT/US2018/026343 filed on Apr. 5, 2018, which claims priority to and the benefit of U.S. provisional patent application No. 62/482,594 filed on Apr. 6, 2017. The preceding patent applications and provisional patent applications are incorporated herein by reference in their entirety.

The above-referenced PCT international application was published as PCT International Publication No. WO 2018/187633 on Oct. 11, 2018 and republished on Dec. 6, 2018, which publications are incorporated herein by reference in their entireties.

STATEMENT REGARDING FEDERALLY SPONSORED RESEARCH OR DEVELOPMENT

This invention was made with Government support under DE-AC52-07NA27344, awarded by the U.S. Department of Energy (DOE). The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to gas filtration and pollutant arrester systems, and more particularly to devices and methods for nanoporous metal foam air and gas filters that are capable of efficiently filtering sub-0.3 micron sized particles through trapping, absorption, adsorption and/or catalytic reaction functions.

2. Background Discussion

Attempts to regulate particulate matter emissions in urban areas date back to the formation of sizable urban areas in the early stages of the industrial revolution. Even then, the relationship between particulate matter emissions and possible health effects, crop and vegetation damage and building discoloration and corrosion was apparent. Since that time, particulate matter emissions have been identified as causal factors in many health conditions, such as lung disease and related illnesses in humans, and in observed injuries to the environment.

Particulate matter (PM) is typically a complex mixture of micron sized organic or inorganic particles and liquid droplets that are classified according to size. Particles may include dusts; organic carbon compounds; salts in the form of nitrates, carbonates, chlorides, sulphates, etc.; oxides; heavy metals; black carbon, biological matter such as viral particles, and so on.

Serious health effects observed with exposure to particulate matter will also depend on the specific size, morphology and chemical composition of the particles. Because particles that are larger than 10 μm are effectively filtered out by the nose and upper respiratory tract, most air quality standards measure particles equal to or smaller than 10 μm. Particles with diameters that are between 2.5 μm ($PM_{2.5}$) and 10 μm ($PM_{10}$) are called coarse particles. Particles of less than 2.5 μm in diameter are called fine particles and particles of less than 0.3 μm ($PM_{0.3}$) are called ultra-fine particles.

Deleterious health effects associated with $PM_{2.5}$ and $PM_{0.3}$ particle exposures are believed to arise from both the small particle size and the particle composition. Fine and ultra-fine particles can be inhaled deeply into the respiratory system where they can trigger inflammation and a range of short and long-term symptoms and particles may even enter the circulatory system. Some groups of people are particularly sensitive to particulate pollution, such as individuals with heart or respiratory diseases. Short-term exposures to particulate pollution can aggravate lung diseases such as asthma and bronchitis, and may also increase susceptibility to respiratory infections. Long-term exposures may result in reduced lung function, chronic bronchitis, and lung cancer.

Fine particles may also remain suspended in the atmosphere and can travel long distances while polluting ground and surface waters, and may in some cases contribute to climate change. Persistent particle distributions in the atmosphere allow sources of particle pollution to combine in distant locations, thereby multiplying the effects.

Fine particles can be a significant fraction of particulate matter emissions from many sources globally. Over 90% of all particulates such as those found in smog are in the sub-0.3 micron regime, which pose the greatest health risks and are the most difficult to capture via filtering. While a key part of the solution to the problem of particulate pollution and other airborne particles rests in reducing emissions and suppressing pollutants at the source, equally important is the development of materials that can effectively capture fine and ultra-fine particles.

Strong public demand for particulate matter control has stimulated the development of several emission control technologies. For example, fabric filters, electrostatic precipitators, Venturi scrubbers and many other approaches have been developed for particulate matter control.

The size and chemical composition of the particles also determines the removal strategies and techniques that may be available. However, fine and ultra-fine particles can be relatively hard to collect from an emission stream. There are few effective filters for such small particles.

Conventional air filters, such as high-efficiency particulate air (HEPA) filters, are designed to capture large particulates, such as pollen and dust particles, that are over 0.3 microns in size. Current filter media with HEPA ratings, however, have such a high pressure drop that air flows are quickly reduced, limiting their ability to clean gases or air in even modestly sized rooms.

The danger posed by small airborne particles is further seen in the severe acute respiratory syndrome coronavirus 2 (SARS-CoV-2) and the associated coronavirus disease 2019 (COVID-19). The coronavirus is approximately 0.1 µm in size and travels primarily through attachment to airborne particles and aerosols. Virus-laden aerosols are usually one micron in size or smaller and therefore are particularly dangerous. Their small size and ability to penetrate deep into one's respiratory system heighten the risk they pose to human beings. Unfortunately, some existing filter technologies have limitations that make them unsuitable for sustained use by the general population against viral particles.

For example, filters that use fiberglass fibers are fragile, deteriorate under high temperature and high relative humidity, and are difficult to thoroughly clean. Filters based on carbon nanotubes typically exhibit mechanical brittleness and, when broken, cause new particulates to become airborne. Polymeric fibers (e.g., polypropylene fibers used in HEPA and N95 facemasks) are vulnerable to degradation when exposed to ultraviolet (UV) radiation, organic solvents, and chlorine-based solutions, which makes them difficult to decontaminate and reuse. Further, continued reliance upon single-use face masks and/or other filters may pose environmental challenges due to the volume of masks and filters that are discarded on a daily basis.

Accordingly, there is a need for devices and schemes for the effective removal or reduction of fine and ultra-fine particles from air and gas flows, fluid flows, and/or emission streams.

BRIEF SUMMARY

The apparatus and methods of the present technology for removing fine and ultrafine particles from a gas stream are centered generally on configurations of nanoporous metal foams and coated metal foams. Such foams have several exploitable electrical, magnetic, mechanical, optical and chemical properties due to their extremely high surface areas, nanoscale constricted geometries, and high porosity.

Nanoporous metal foams offer a platform for sub-0.3 micron particle collection by combining: 1) physical processes such as trapping and electrostatics/ionization to capture particulates; 2) absorption or adsorption of certain gases into the metal foam; and 3) catalytic reactions to neutralize toxic smog species by using the metal foams as catalysts, for example.

In some embodiments, a particle separation system for filtering gas and/or fluid processes a gas, fluid, or emission stream containing sub-0.3 micron particles with an optional pre-treatment module, a metal foam module, a coated foam module, and an optional post-processing module. Illustratively, the system can be configured with modules having characteristics directed to the removal of specific types of known particulates from an emission source or generalized for air purifications.

The pre-treatment module is designed to remove larger sized solids, aggregates or liquids from the gas or emission stream and may use conventional scrubbers, filters, and/or other collectors. The apparatus can be configured for use within the exhaust stream of existing systems to eliminate particles or for independent use to remove particles from the atmosphere. Many existing systems are not able to remove fine and ultrafine particles that may be released to the atmosphere.

The gas stream emerging from the pre-treatment module is preferably devoid of solid or liquid particulates that are larger than approximately 2.5 μm and preferably larger than 1.0 μm, which were removed by the module.

The metal foam module may use one metal foam or multiple metal foams having controlled dimensions, density, composition, pore size distributions, and/or other mechanical properties. A metal foam may have a single density or may feature two or more sections having different densities.

In some embodiments, the metal foam module has a continuously varying foam density producing a pore size gradient so that particles of different sizes collect in different regions of the metal foam. Further, several foams of different densities can also be aligned sequentially to capture particles of different sizes according to the pore sizes.

In other embodiments, foams of the same or different metals with different characteristics are paired. Conductive metal foams may also have a voltage applied in a further embodiment.

The second foam module may be a coated metal foam or may comprise a series of coated metal foams. Coatings of foam pores and surfaces can be selected based on chemical or electrical characteristics. For example, coatings may include carbon, a metal oxide, or a specific catalytic material.

Finally, the post processing module may induce changes in temperature, pressure, or condensation of any remaining materials in the fluid flow, as well as collect desirable gases or vapors.

Although a metal foam module and a coated metal foam module are discussed in tandem to illustrate some embodiments, in other embodiments single modules of either metal foams or coated metal foams, or multiple foams of different metals or coatings, can be configured.

A particle separation system described herein can be configured to take advantage of several different particle-trapping and chemical reaction mechanisms in concert and/or sequentially to collect the very small particles. For example, electrostatics and ionization effects can be exploited to attract small particles. In some embodiments, a metal foam is electrified and used as an ionization grid while a second foam coated with carbon or metal oxide is used to trap charged particles. Charged particles from the foam may alternatively be collected using a conventional charged plate or other means. Adsorption and desorption of offensive gases by the large surface areas of the metal and coated metal foams is another available pollutant-arresting mechanism.

Chemical or catalytic mechanisms are also available for emission neutralization. Both metal foams and coated or oxide foams may provide different catalytic or chemical activity. Metal foam coatings can be selected for specific activity toward target gases such as catalysts for gas chemisorption or physisorption. Current technologies in the art usually only use one type of physical or chemical mechanism to capture or neutralize certain species of particulates in emissions. The present technology combines several mechanisms to achieve the air cleaning goal, including physical processes such as trapping, ionization and electrostatics to capture particulates; absorption of certain offensive gas into the metal foam; and catalytic reactions to neutralize toxic smog species by using the metal foams as catalysts. As a result, the foams perform far better than currently existing technology.

According to one aspect of the technology, a gas or fluid filtering system uses metal foams that combine ultralight weight with a multitude of functionalities such as durability, renewability, tunability, reactivity and vast surface areas. They offer a completely new approach to combat the air pollution problem, in that the material properties can be tailored to achieve "smart" air filters.

Another aspect of the technology is to provide cost-effective, mass-producible, portable, durable and renewable devices that can provide personal protection, such as household air-filters and respirators that work in the sub-0.3 micron regime, wearable "catalytic clothing", etc.

A further aspect of the technology is to provide an advanced method of treating and capturing contaminants such as smog, through trapping, absorption and/or catalytic reactions, that is cost effective, renewable and durable.

Another aspect of the technology is to provide a system and methods that can be tailored and adapted to collect particulates of specific sizes and chemical compositions.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawings which are for illustrative purposes only.

DETAILED DESCRIPTION

Referring more specifically to the drawings, for illustrative purposes, embodiments of systems and methods for fine and ultrafine particle separations from gas streams using low-density interconnected metal foams are generally shown. Several embodiments of the technology are described generally in FIG. 1 through FIG. 2 to illustrate the separation system and methods. It will be appreciated that the methods may vary as to the specific steps and sequence and the systems and apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
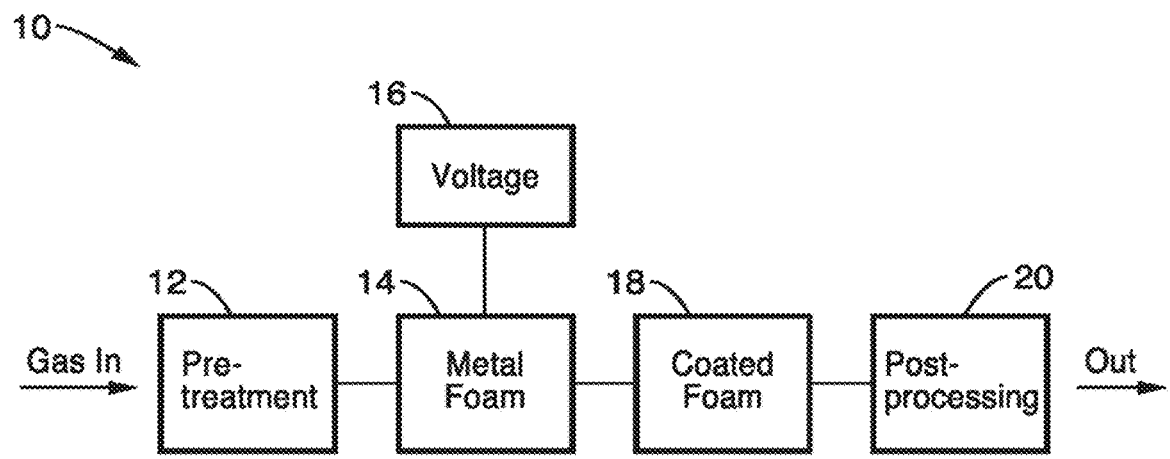
FIG. 1 is a schematic system diagram of a particulate separator with pre-treatment, metal foam, coated foam and post processing modules according to some embodiments of the technology.

Turning now to FIG. 1, one embodiment of a particle separation system 10 is shown schematically to illustrate the adaptability of the system to different particle separations from a wide variety of gas or emission sources. In the embodiment shown in FIG. 1, particle separation system 10 includes a series of processing modules that may be individually configured to process specific gases or emissions and removal of specific types and/or sizes of particles. The modules can also be configured to provide different physical, chemical and electrostatic mechanisms to selectively remove particulates and/or other contaminants from a variety of sources.

In the embodiment illustrated in FIG. 1, the separation process generally begins with the introduction of a contaminated gas or fluid to pretreatment module 12. One purpose of pretreatment module 12 is to remove large particles from the input stream that could foul the smaller particle separators. The pretreatment module thereby helps prepare the input stream for fine and ultrafine particle separations in one or more subsequent modules. However, particles in a gas or fluid stream may be less than 0.3 µm in size, in which case pretreatment module 12 may be optional.

When employed, pretreatment module 12 can incorporate many existing large particle removal devices and schemes in the art, such as scrubbers, fabric separators, HEPA filters and the like. These devices/schemes function to remove larger particles and droplets and thereby reduce the size of particles remaining in the input stream to fine and ultrafine particles.

Pre-treatment module 12 may also prepare the input gas or fluid stream in some other manner for processing by the next module. For example, pretreatment module 12 can provide control over the temperature, pressure, and/or humidity of the stream that is introduced to metal foam module 14.

Many existing emission treatment systems are not capable of fine particle removals and instead are limited to removing larger particles. Modules subsequent to pretreatment module 12 of system 10 can be integrated into existing emission treatment systems to improve the performance of those systems.

Metal foam module 14 may be made with one or more metal foams contained in a single housing or an array of housings with gas inputs and outputs that allow gas to flow through the housing(s) and metal foam(s). The metal foams are preferably low cost and low density metal foams, with tunable densities between approximately 50% and approximately 0.01% by volume of the bulk density.

Several different fabrication schemes may be used to produce metal foams, including sol-gel methods, selective dealloying of a binary alloy (which involves selectively etching a less-noble metal from a bimetallic alloy), and combustion synthesis such as the thermal decomposition of transition-metal complexes containing high nitrogen energetic ligands.

One particular method of metal foam fabrication involves use of interconnected metallic ultrafine wires. The term ultrafine wire is used in a general sense for a nanoscale or micro-scale element and is intended to include a variety of structures such as tubes, rods, wires, ribbons, fibers, etc., which have dimensions on the nanometer to micron scale and are either solid or hollow. The metal wires may be made from pure metals such as Al, Ti, V, Cr, Fe, Co, Ni, Cu, Zn, Ga, Y, Zr, Nb, Mo, Ru, Rh, Pd, Ag, Sn, Sb, La, Nd, Sm, Dy, Pt, Au, Pb, and Bi, and/or from alloys based on one or more of these metals. Combinations of compatible metal wires can also be used to form the metal foams.

The metal wires are assembled into interconnected metallic foams that are mechanically strong. The voids or porous "pockets" inside the foam are adjustable, both in size and density, by tuning the synthesis conditions. The typical "pocket" size varies from nanometer scale to microns, ideally suited to trap the most harmful <0.3 µm sized particulates.

In some embodiments, fabrication of a metal foam involves forming a dispersion of selected metal nanowires in a liquid. The nanowire dispersion is then placed in a form and frozen. The frozen molded forms are then placed into a vacuum chamber and the frozen liquid sublimates under controlled conditions leaving a structure of interlocked nanowires. The loosely interlocked nanowire structure is sintered to bond the points of contact between the nanowires to form the final foam without significant increase in density.

The concentration or density of the nanowires within the dispersion and the nanowire dimensions can be controlled to tune the density of the final foam. The dispersion may be prepared with the density of nanoscale metal wires tuned to a given application over a continuous range from 0.01% to 50% by volume.

The tunability of the pore size and density as well as other aspects of the metal foams permits the foams to collect of particles of predictable sizes. For example, metal foams with a pore size gradient can be achieved by continuously varying the foam density, so that particulates with different sizes will be trapped at different regions of the foam(s).

Figure 2:
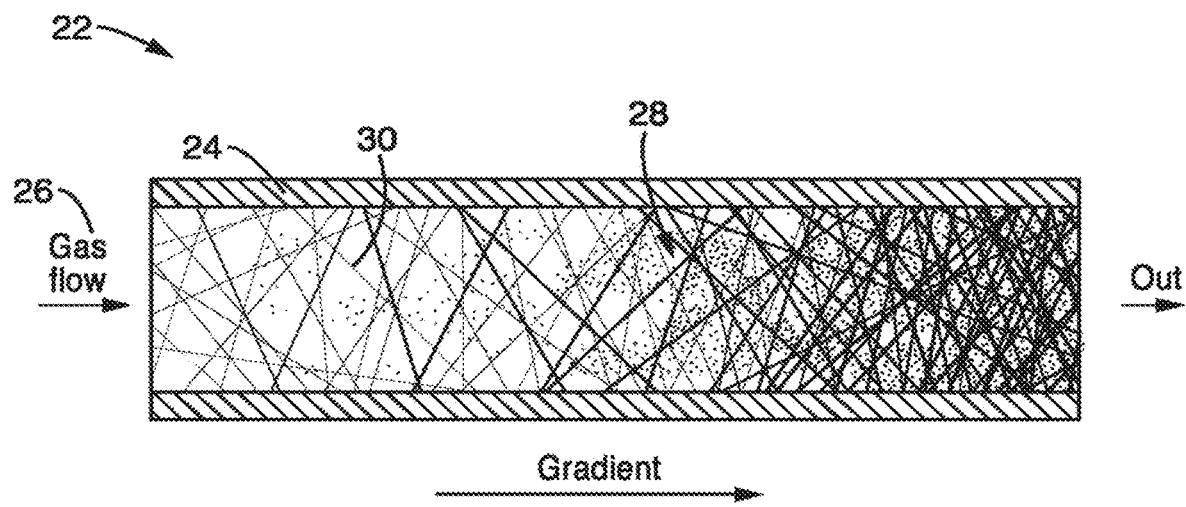
FIG. 2 is a schematic cross-sectional view of a gradient metal foam separator according to some embodiments of the technology.

Referring also to FIG. 2, a separator 22 with a metal foam disposed in a housing 24 is shown schematically in cross-section. The metal foams of increasing densities of nanowires 30 and decreasing pore 28 sizes forms a gradient. The particulates in the flow 26 of gas or emissions through the housing 24 will encounter smaller pores along the length of the housing 24 to the output in this embodiment.

In some embodiments, the metal foams of module 14 can be electrified with a controlled voltage from a voltage source 16. Charged metal foams can be used to produce electrostatic or ionization effects to trap very small particulates and gases.

Coated foam module 18 of system 10 of FIG. 1 receives the output of metal foam module 14. The foam or foams of module 18 are preferably coated with at least one metal oxide or a form of carbon. The metal oxide coating of a foam can be selected for its catalytic activity or characteristics of a specific target. The oxides can be coated onto metal foams using electroless deposition or atomic layer deposition, for example. Such metal foams can trigger chemical reactions and neutralize smog into harmless gases. Since the catalysts just facilitate the chemical reactions, they are not spent themselves; the foams therefore remain intact.

Although oxide coatings are discussed here, other coatings such as nitrides, chlorides, hydrides, fluorides, iodides, amines etc. may also or instead be used to coat a foam in module 18. Such coatings may be selected based on the reactivity of the coatings with constituents of the gas or emission flow. In addition, several different coated foams can be used in module 18 to produce a variety of different functionalities or characteristics.

The output from coated foam module 18 is optionally received by post-processing module 20 in the embodiments illustrated in FIG. 1. Post processing may include separating desirable gases in the filtered gas or fluid stream from undesirable gases. Collected undesirable gases such as CO, $CO_2$, $H_2S$, and $SO_2$ and others may be captured or processed further. Post processing at module 20 may also or instead include the use of condensers, scrubbers, and/or changes in pressure and/or temperature to treat or separate remaining components from the gas or fluid stream.

In addition to the physical mechanisms for trapping fine and ultrafine particles provided by the processing modules of FIG. 1, a particle separation system can also be configured to exploit electrostatic, ionization, and/or chemical mechanisms.

Electrostatic interactions have been commonly used to attract very small particulates. These interactions can be enhanced with a charged foam. For example, air ion emissions can transfer charges to an originally charge-neutral particle giving the particle an overall charge and thus enhance the electrostatic effect.

The conductive nature of the metal foams of module 14 and the voltage source 16 provides an additional handle to take advantage of this effect. For example, two metal foams can be used in tandem in the embodiments shown in FIG. 1. In particular, a charged first metal foam of module 14 can be used as an ionization grid, while a second metal foam of module 18 may be coated with a thin layer of carbon or $TiO_2$ that can act as a supercapacitor to attract and trap charged particulates.

Other mechanisms that can be utilized are absorption and adsorption of offensive gases by a metal and/or coated metal foam. Low-density foams have very large surface areas that can provide very effective mechanisms for absorption and/or adsorption. The absorption/adsorption effectively takes the offensive gases out of the environment.

A trapped gas can be released through a desorption process into a controlled exhaust under suitable temperatures and pressures. The cycle can repeat itself, thereby providing renewability of the foams. This feature may be applicable to primary smog gases, such as nitrogen oxides, carbon oxides, sulfur oxides, ammonia and ozone.

Chemical mechanisms may also be used for contaminant neutralization. The large surface/volume ratio in the metal foams and coated metal foams may drastically enhance the catalytic activity in comparison with bulk materials, leading to much higher chemical reactivity.

A variety of metal foams, such as those formed from Cu, Ni, Pd, Pt, Au, Ag, Pb, Sn, Ti, Fe, Co, Nb, Mo, Ta, W, and/or Al are good catalysts, which can trigger NO reduction, CO methanation or oxidation, ethylene hydrogenation, methane combustion or reaction with NO, methanol synthesis, etc.

Certain solid metal oxide semiconductors such as $TiO_2$, ZnO, $V_2O_5$, $MoO_3$, $SiO_2$, and $Ni_xCr_{1-x}Mo_xP_{1-x}O_4$ are excellent photocatalysts. They can be excited by light with energy higher than the band gap, leading to electron-hole pairs that participate in a surface reaction, to trigger photodegradation of toxic contaminants. The oxides can be used to coat metal foams using a variety of methods such as electroless deposition or atomic layer deposition. Such metal foams can trigger chemical reactions and neutralize smog into harmless gases. Since the catalysts just facilitate the chemical reactions, they are not spent themselves; thus, the foams remain intact.

Other metal oxides for foam coatings can be selected based on the adsorption capacity, sensitivity and selectivity for target gases for removal from the effluent or gas stream. For example, MgO and CaO have been shown to destructively adsorb organophosphorus compounds. $NH_3$, $SO_2$ and $CO_2$ and other gases can be adsorbed on to metal oxides such as ZnO, $WO_3$, $SnO_2$, CaO, MgO, $Fe_2O_3$, $TiO_2$, $ZrO_2$, $Li_2O$, $Li_2SO_4$ and $Al_2O_3$, for example. Mixed metal oxides such as $RuO_2$—$TiO_2$, $IrO_2$—$TiO_2$, $RuO_2$—$Co_3O_4$—$SnO_2$—$RuO_2$ and others have been shown to have desirable activity and therefore can also be used as metal foam coatings. Metal oxide coatings may also be doped with reactive materials in some settings. Target gases may also be desirable gases for collection, such as hydrogen.

Metal foams in some embodiments described herein employ a single electrodeposition process, while fabrication of metal foams according to other embodiments may involve multiple rounds of electrodeposition to further increase the surface area of the metallic foam structure.

A second round of electrodeposition has been found to promote nucleation and the roughening of the coated nanowires, which partially accounts for the increased surface area and fiber surface curvature, and also increases the foam's effectiveness in intercepting airborne particles. Additional electrodeposition also helps stiffen the foam to withstand greater compressive stress.

Illustratively, a single electrodeposition process applied to bare nanowires may yield a coated metal foam having a bulk density around 1%. One or more subsequent electrodeposition processes may be customized to yield similar or greater bulk densities as discussed in one of the example implementations described below. An illustrative range of final densities is between 2% and 30%.

The technology described herein may be better understood with reference to the accompanying examples, which are intended for purposes of illustration only and should not be construed as in any sense limiting the scope of the technology described herein as defined in the claims appended hereto.

Example 1

In order to demonstrate the functionality and operational principles of the particulate removing platform and methods, nanostructured palladium metal foams were fabricated and evaluated.

Polycrystalline Pd nanowires were fabricated by electrodeposition into porous templates, then harvested from the templates and suspended in water. Palladium nanowires were fabricated by electrodeposition from an aqueous solution of 6 mM $PdCl_2$+0.1 M HCl (1 M=1 mol $L^{-1}$). Electrodeposition was performed at −450 mV relative to a $Ag^+$/AgCl reference electrode into Au-coated (working electrode) anodized aluminum oxide (AAO) or track-etched polycarbonate membranes.

Nanowires with diameters of (10-200) nm and lengths of (3-20) μm were produced. After deposition, the Au working electrode was selectively etched using a solution of 0.4 M $K_3Fe(CN)_6$+0.2 M KCN+0.1 M KOH.

The AAO (polycarbonate) membranes were then dissolved by sonicating them in 6 M NaOH (dichloromethane). The nanowires were transferred to distilled or deionized water using a precipitation/decanting/solvent replacement technique.

Nanowires were then freeze-cast into foam monoliths. To construct the nanowire foam, the wires were allowed to precipitate out of solution and the water level was adjusted to the nominal final volume of the foam. The settled nanowires were then sonicated to develop a randomly dispersed slurry, which was immediately immersed in liquid nitrogen, freezing the wires in a random distribution in the ice matrix.

The frozen slurry was then placed in vacuum (<0.1 Pa) for >12 h to sublimate the interstitial ice, leading to the pure Pd nanowire foam. The mechanical strength of the foam was further enhanced by sintering.

Scanning electron microscopy, and high-resolution transmission electron microscopy was performed on both the foams and individual wires. Scanning electron microscopy micrographs confirmed the highly porous structure of the fabricated foams. For Pd foams composed of 200 nm diameter, 15 μm long wires, the foam density was tunable between 12 and 135 mg $cm^{-3}$, corresponding to a density that is only 0.1-1% of bulk Pd.

This synthesis approach is scalable for industrial applications, as wet chemistry-based solution synthesis is well suited for mass production of nanowires and industrial sized freeze-drying devices are readily available. In this work, we focus on an example monolith which has a density of 41±3 mg $cm^{-3}$ and surface area of 6.9±0.1 $m^2$ g $(Pd)^{-1}$ (the confidence interval represents one standard deviation, and is determined by the accuracy of the measurement tools); porosity measurements show that the foam has few constricted volumes (e.g., cavities or cracks).

Example 2

To further demonstrate the capabilities of the metal foams, the Pd metal foams were evaluated for gas storage capacity and as a catalyst. Hydrogen absorption/desorption measurements were performed using a commercially available precision gas dose controller with forked sample tube and a Calvet-type twin microcalorimeter.

Equilibrium was defined as a pressure change of <0.01% over 10 s. Thermodynamic measurements were performed using a constant temperature (37° C.), incremental dosing approach and by integrating the heat flow from the calorimeter. Rate of adsorption (ROA) measurements were also performed.

The X-ray diffraction (XRD) pattern of the Pd nanowires showed the Pd (111) and (200) peaks, identifying a cubic lattice parameter of a=3.86±0.01 Å, consistent with bulk values. After a 1 h exposure to ≈200 kPa hydrogen (at 25° C.), the peaks shifted to lower 2θ values as a increased to 4.00±0.01 Å, signaling the formation of $PdH_x$.

The hydrogen could be desorbed by heating (250° C. for 30 min in air) or vacuum (30 min, 25° C., $P_{Base}$<0.01 Pa), as indicated by the shifting XRD peaks. Translation of the peaks, rather than broadening or splitting, indicates that the hydrogen penetrates the entire wire uniformly, compared to bulk palladium in which penetration is limited by the rate of hydrogen diffusion. Interestingly, after successive hydrogen exposures, the $PdH_x$(111) peak shifted to lower angles, indicating the lattice parameter for the $PdH_x$ increases with cycling, corresponding to enhanced hydrogen absorption.

Palladium foam monoliths demonstrated excellent characteristics for hydrogen storage applications, including their hydrogen loading capacity, rate of absorption, and heat of absorption. The hydrogen absorption/desorption process is highly hysteretic, along with substantial lattice expansion/contraction as the foam converts between Pd and PdHx. Such foams with pristine metal surfaces are also suitable for use as catalysts.

Example 3

Electrochemical deposition of Cu into anodized aluminum oxide (AAO) templates 60 μm thick and having pores of 0.2 μm was carried out in 240 g/L copper sulfate ($CuSO_4$) electrolyte with an applied potential of −200 mV relative to a $Ag^+$/AgCl reference electrode. Nanowires were subsequently liberated by dissolving the AAO in a strong base solution (e.g., 6M sodium hydroxide (NaOH)). After the liberated nanowires sank to the bottom of the solution, fluid exchanges were used to replace the solution with deionized water. At this point, the density of the initial metallic foam can be tuned between 0.1% and 2% of bulk density by adjusting the ratio between the water and the nanowires. The nanowire/water suspension was then frozen in liquid nitrogen and pumped in vacuum (<0.1 Pa for >12 h) to sublimate the ice. The resultant free-standing and self-supporting foam was strengthened by sintering at 300° C. and simultaneously undergoing multiple oxidation/reduction cycles. In each cycle, the Cu foam was oxidized by exposure in air and then reduced using a forming gas (e.g., 5% hydrogen, 95% nitrogen).

In this example, foams with densities equal to approximately 1% of the Cu bulk density were achieved after this first synthesis of electrodeposition and sintering (referred to as 1ED-Cu hereafter). Such foams have extremely large surface area-to-volume ratios, up to $10^6:1$ $m^{-1}$ that are highly effective for filtration. These foams were further strengthened with a second electrodeposition step (referred to as 2ED-Cu hereafter) such that the final foam density was tuned between 2% and 30% of Cu bulk density.

The second electrodeposition process differed from the first in that it was carried out using 240 g/L $CuSO_4$+0.48 mg/L NaCl+3.1 g/L Polyethylene Glycol (PEG-10000 ($C_{2n}H_{4n+2}O_{n+1}$))+1.7 mg/L 1-(2-Hydroxyethyl)-2-Imidazolidinethione ($C_5H_{10}N_2OS$)+1.7 mg/L Janus Green B ($C_{30}H_{31}ClN_6$)+0.6 mg/L Thioglycolic Acid ($C_2H_4O_2S$) with an applied potential of −200 mV relative to a $Ag^+$/AgCl reference electrode. The inclusion of cuprous intermediates, formed by the interaction of Cu salts with the additives, affected the overpotential and the kinetics of the copper deposition at the substrate surface. Here, polyethylene glycol (PEG) was used as a suppressor, Janus Green B and 1-(2-Hydroxyethyl)-2-Imidazolidinethione as leveling agents, and thioglycolic acid as an accelerator. Other suppressors, leveling agents, and/or accelerators may be employed in other environments or embodiments. The thickening and density of the metal foam that results from this second electrodeposition step can be controlled by adjusting the total amount of deposited materials.

2ED-Cu foams plated to 5%-30% bulk density were examined with scanning electron microscopy (SEM). Images of 5%, 15% and 30% bulk density meal foams are shown in FIGS. 3A-F; the scale bar in each image corresponds to 10 μm. The images of FIGS. 3A-F demonstrate the three-dimensional, rigid, physically interlocked structure of the metal foams.

For a 5% density foam, SEM images show that the arbitrary arrangement of interconnected nanowires creates a highly porous structure. In addition, nanowire diameter increases substantially from the initial 0.2 μm size after the 1st ED to up to 0.5 μm in the foam interior (FIG. 3A) and 0.9 μm on the foam exterior (FIG. 3B) after the 2nd ED process. Importantly, thickening of the foam not only occurs along individual nanowires but also at intersections of nanowires, creating a three-dimensional scaffold over the 1ED-Cu foam where the contact areas between intersecting nanowires are increased by over an order of magnitude. This step significantly enhances mechanical stability of the foam.

SEM images of the 5% 2ED-Cu foam interior reveal that the nanoporous foam morphology is preserved along the sample thickness. Moreover, the 2nd ED process created numerous tiny granular textures along the nanowires, with sizes ranging from approximately 0.1 μm to 0.5 μm. These nucleation/growth sites further increase the overall surface area and surface curvature of the foam.

Figure 3A:
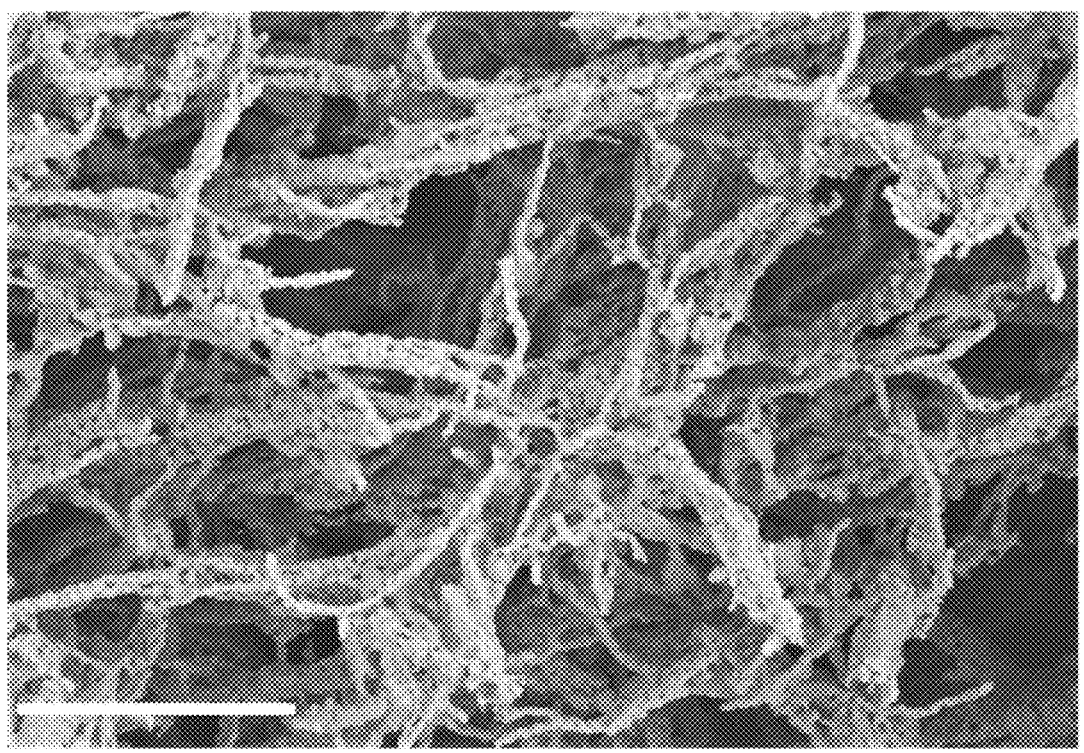
FIGS. 3A-3F comprise SEM images of metal foams of different bulk densities according to some embodiments of the technology.
Figure 3B:
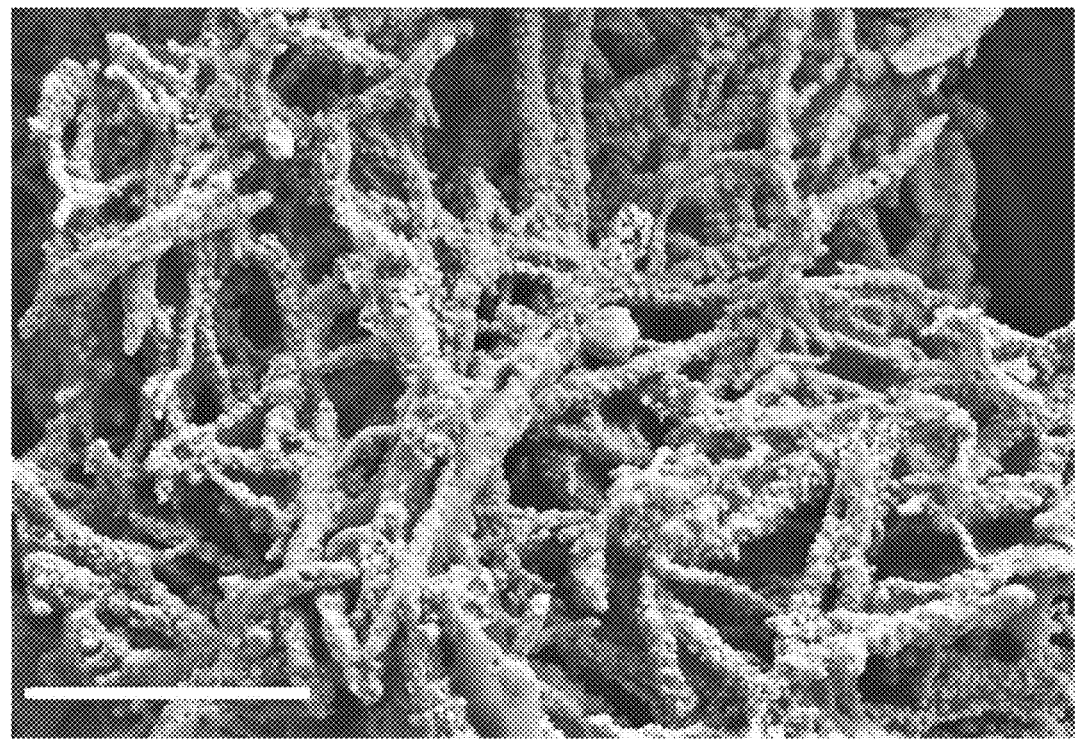
Figure 3C:
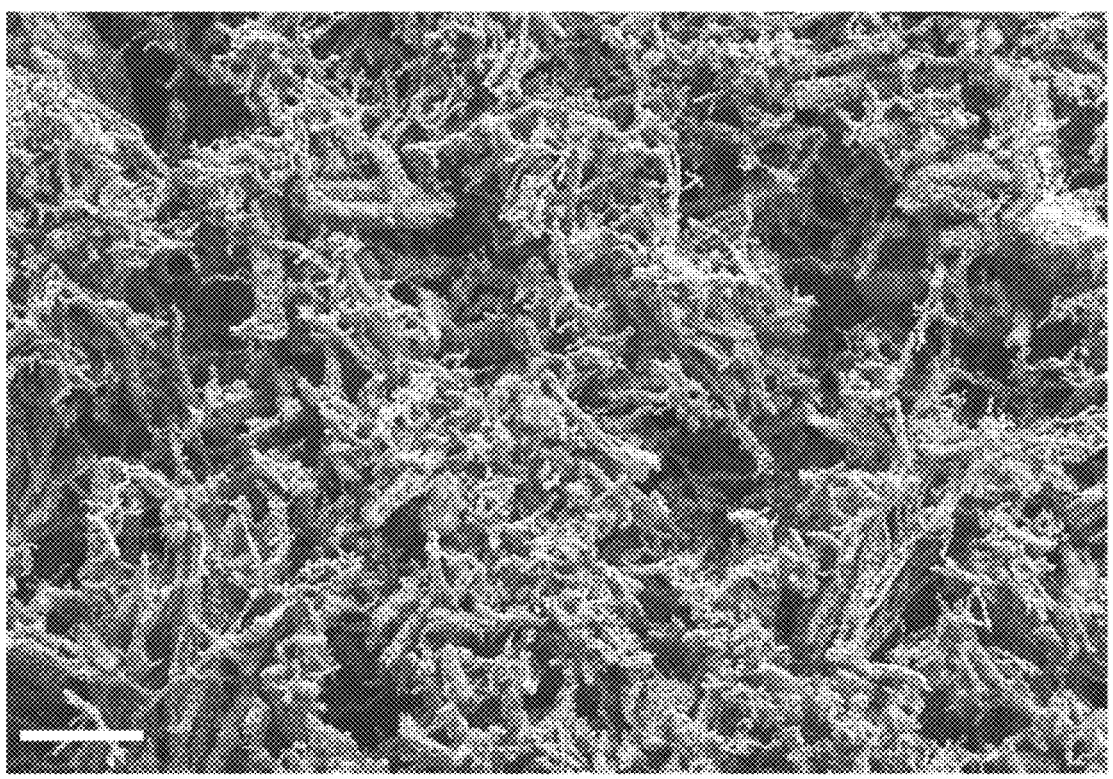
Figure 3D:
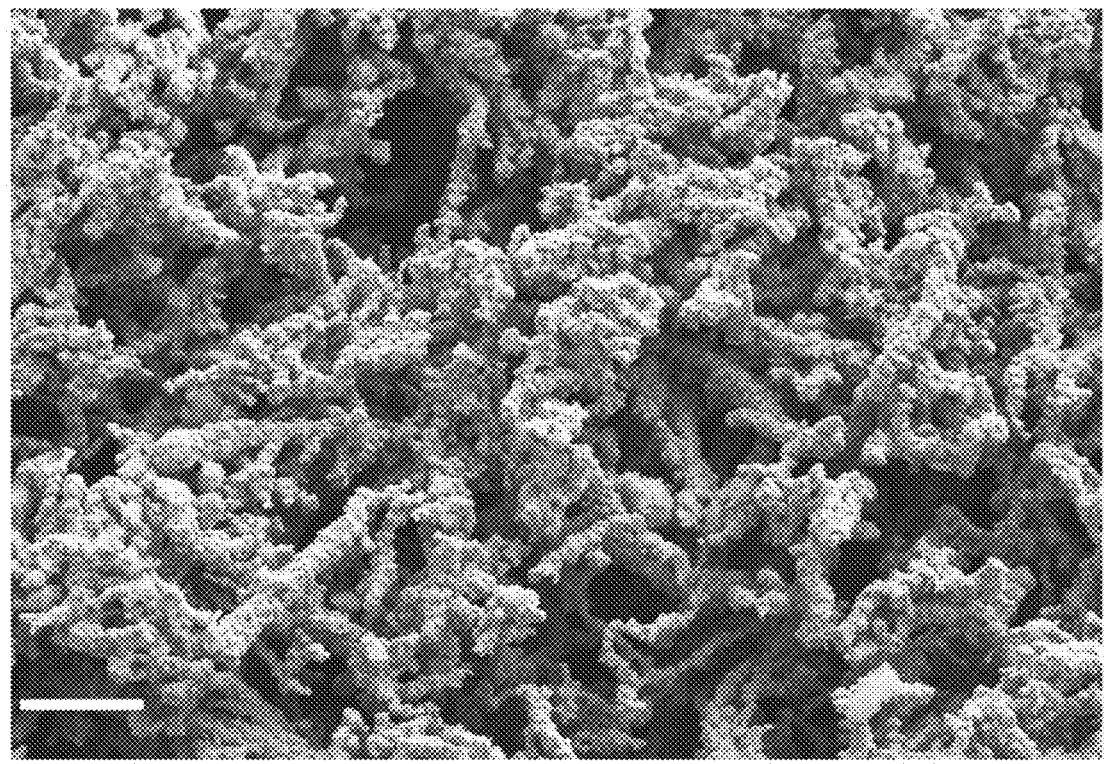
Figure 3E:
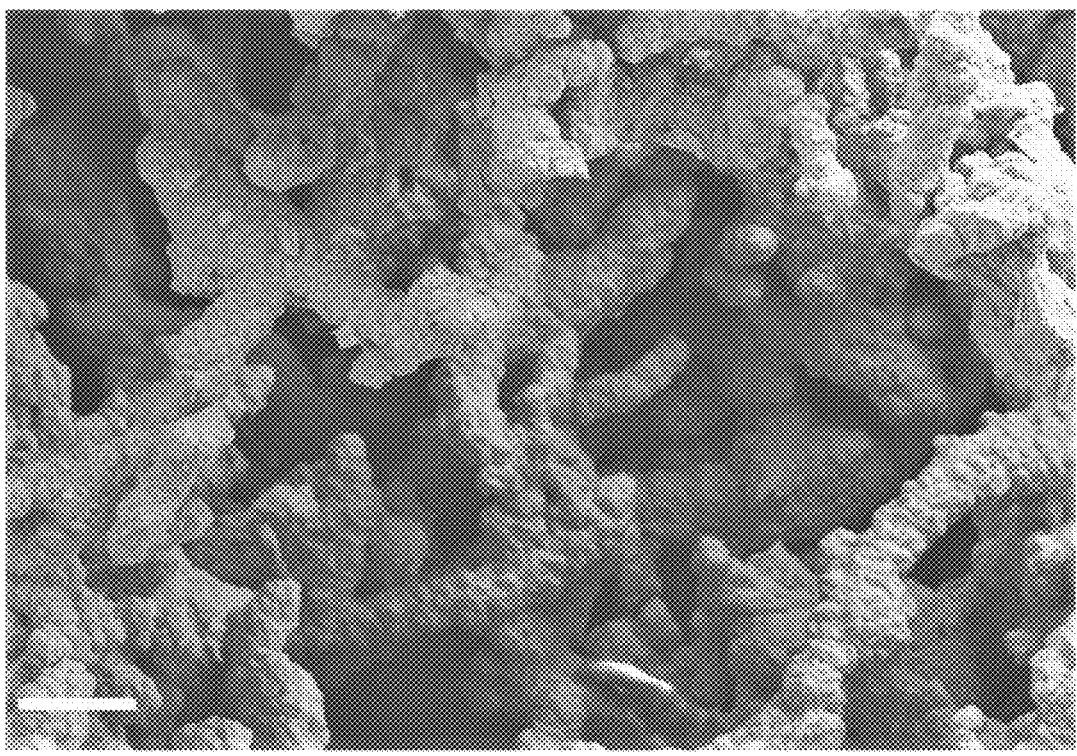
Figure 3F:
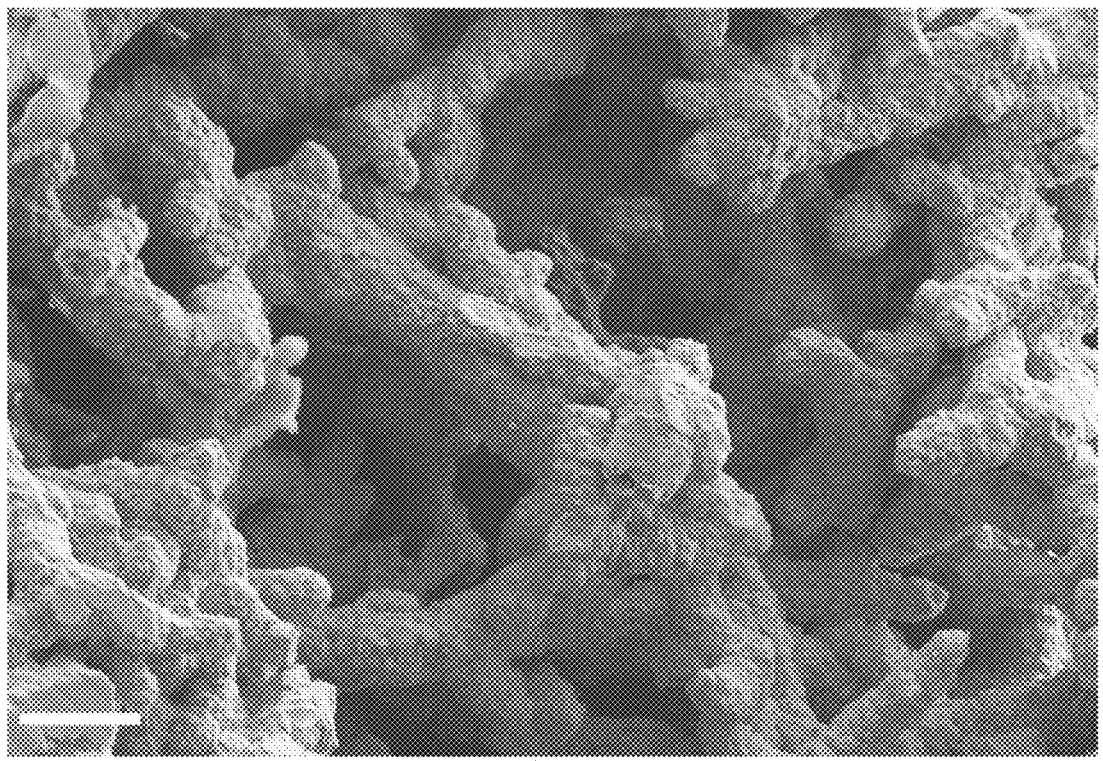

In a 15% density foam, nanowire diameter has increased to approximately 1.1 μm in the foam interior (FIG. 3C) and 1.9 μm on the exterior (FIG. 3D), but surface roughness may slightly decrease as the 2ED nucleation sites increase in size and begin to coalesce. In a 30% density foam, the average nanowire size has increased to approximately 5 μm in the foam interior (FIG. 3E) and 6 μm on the exterior surface (FIG. 3F). Surface roughness is further reduced as the 2ED forms a contiguous coating over the 1ED foam.

Figure 4:
FIG. 4 is a photograph of an illustrative metal foam according to some embodiments of the technology.

An illustrative implementation of a 15% 2ED-Cu foam disc 1.4 mm thick and 9 mm in diameter weighs approximately 120 mg but can support a 1 kg weight without collapsing. FIG. 4 illustrates such a metal foam disc resting upon bristles of a green foxtail plant (*Setaria viridis*) without bending them. Other illustrative foams range in thickness from less than 1 mm (e.g., 0.8 mm) to multiple millimeters. Metal foams and coated metal foams described herein can be easily cleaned of particles and particulate matter through rinsing in water or other cleaning agents, sonication, and/or treatment with a stream of compressed air.

From the description herein, it will be appreciated that that the present disclosure encompasses multiple embodiments which include, but are not limited to, the following:

1. A metallic foam structure for air and gas purifications, comprising: an interconnected ultrafine metallic wire network, the metallic wire network having a plurality of nanometer to micron scale pores; and a coating on exterior surfaces of the metallic wire network and pores to produce a coated metallic foam.

2. The metallic foam structure of any preceding or following embodiment, wherein the coating comprises a catalytic metal oxide selected from the group consisting of $TiO_2$, ZnO, $V_2O_5$, $MoO_3$, $SiO_2$, and $Ni_xCr_{1-x}Mo_xP_{1-x}O_4$.

3. The metallic foam structure of any preceding or following embodiment, wherein the coating comprises a metal oxide selected from the group consisting of $WO_3$, $SnO_2$, CaO, MgO, $Fe_2O_3$, $ZrO_2$, $Li_2O$ and $Al_2O_3$.

4. The metallic foam structure of any preceding or following embodiment, wherein the coating comprises a mixed metal oxide.

5. The metallic foam structure of any preceding or following embodiment, wherein the coating comprises a layer of carbon.

6. The metallic foam structure of any preceding or following embodiment, wherein the metal nanowire network is formed from one or more metals selected from the group of metals consisting of Al, Ti, V, Cr, Fe, Co, Ni, Cu, Zn, Ga, Y, Zr, Nb, Mo, Ru, Rh, Pd, Ag, Sn, Sb, La, Nd, Sm, Dy, Pt, Au, Pb, and Bi, and alloys of one or more of these metals.

7. The metallic foam structure of any preceding or following embodiment: wherein the metallic nanowire network having a plurality of nanometer to micron scale pores forms a pore size gradient across a dimension of the coated metallic foam; and wherein particles of different sizes passing through the coated metallic foam will collect in different regions of the coated metallic foam.

8. The metallic foam structure of claim 1, further comprising: an uncoated interconnected ultrafine metallic wire network coupled to the coated metallic foam; the uncoated metallic wire network having a plurality of nanometer to micron scale pores to produce an uncoated metallic foam.

9. The metallic foam structure of claim 8, wherein the uncoated metallic nanowire network is formed from one or more metals selected from the group of metals consisting of Al, Ti, V, Cr, Fe, Co, Ni, Cu, Zn, Ga, Y, Zr, Nb, Mo, Ru, Rh, Pd, Ag, Sn, Sb, La, Nd, Sm, Dy, Pt, Au, Pb, and Bi, and alloys of one or more of these metals.

10. The metallic foam structure of claim 8: wherein the uncoated metallic nanowire network having a plurality of nanometer to micron scale pores forms a pore size gradient across a dimension of the uncoated metallic foam; and wherein particles of different sizes passing through the uncoated metallic foam will collect in different regions of the uncoated metallic foam.

11. A fluid filtration system for removing particulates and contaminants from a fluid flow, comprising: a filter housing with an interior, an intake port and an output port; and at least one filter element disposed within the interior of the housing; the filter element comprising a metal foam of an interconnected ultrafine metallic wire network; the network having a plurality of nanometer to micron scale pores.

12. The system of claim 11, wherein the metal foam has a density from about 20 g/cm$^3$ to about 1 mg/cm$^3$.

13. The system of any preceding or following embodiment, the filter element further comprising: a plurality of metal foams, each foam having a different density aligned sequentially according to density and forming a density gradient within the housing.

14. The system of any preceding or following embodiment, further comprising: a voltage source electrically coupled to the metal foam.

15. The system of any preceding or following embodiment, further comprising: a second filter element coupled to the first filter element within the interior of the housing; the second filter element comprising: (i) at least one interconnected ultrafine metallic wire network, the network having a plurality of nanometer to micron scale pores; and (ii) a coating on exterior surfaces of each metallic wire network and pores to produce a coated metal foam.

16. The system of any preceding or following embodiment, further comprising: a voltage source electrically coupled to the metal foam; and a second filter element of a coated metal foam of an interconnected ultrafine metallic wire network coated with a catalytic metal oxide or carbon, the second filter element adjacent to the first filter element within the interior of the housing; wherein a voltage applied to the metal foam of the first filter element functions as an ionization grid configured to transfer charges to charge neutral particulates; and wherein the second filter element coated foam layer traps charged particles within the pores of the coated foam.

17. The system of any preceding or following embodiment, further comprising: a pre-filter coupled the intake port of the filter housing, the pre-filter configured to remove particulates larger than about 2.5 microns from a fluid flow.

18. A method for removing particulates and contaminants from a fluid flow, the method comprising: forming a nanostructured metal foam, the foam having a plurality of nanometer to micron scale pores; and flowing fluid over or through the metal foam trapping fluid borne particulates within the micron scale pores of the foam.

19. The method of any preceding or following embodiment, further comprising: controlling synthesis conditions of the metal foam formation thereby adjusting the size and density of pores within the metal foam.

20. The method of any preceding or following embodiment, further comprising: continuously varying the pore density of the formed metal foam to produce a pore size gradient; wherein different sized particulates will be trapped at different regions of the metal foam.

21. The method of any preceding or following embodiment, further comprising: coating the pores of the nanostructured metal foam with a coating selected from the group of coatings consisting of carbon, an oxide, a nitride, a chloride, a hydride, a fluoride, an iodide and an amine.

22. The method of any preceding or following embodiment: wherein the metal foam coating is a catalytic metal oxide; and wherein the catalytic metal oxide triggers chemical reactions and neutralizes contaminants.

23. The method of any preceding or following embodiment, further comprising: flowing a stream of gases containing charge neutral particulates over or through the metal foam; applying a voltage to the metal foam to transfer charge to the charge neutral particulates in the stream of gases; and collecting the charged particulates.

24. The method of any preceding or following embodiment, further comprising: forming a second nanostructured metal foam with a plurality of nanometer to micron scale pores, the second nanostructured metal foam coated with a catalytic metal oxide; and collecting the charged particulates in the pores of the second nanostructured metal foam.

25. The method of any preceding or following embodiment, further comprising: forming a second nanostructured metal foam with a plurality of nanometer to micron scale pores, the second nanostructured metal foam coated with a catalytic metal oxide; flowing contaminated gases through the first and second metal foams; adsorbing contaminants from the flow of contaminated gases within the pores of the two metal foams; and desorbing contaminants from the two foams by exposing the foams to a change in temperature and pressure.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A method of constructing a free-standing metal foam, the method comprising:
   electrochemically depositing a selected metal into one or more nanoporous templates to form metal nanowires employing a first electrolyte solution containing the selected metal;
   dissolving the one or more nanoporous templates in a selected solution;
   replacing some or all of the selected solution with water to produce a nanowire/water suspension;
   freezing the nanowire/water suspension into a frozen nanowire/ice mixture;
   sublimating the ice portion of the frozen nanowire/ice mixture to produce the free-standing metal foam comprising a plurality of nanowires, wherein the free-standing metal foam comprises an open-cell structure; and
   further electrochemically depositing more of the selected metal upon and throughout the free-standing metal foam, using a second electrolyte solution including one or more leveling agents in a homogeneous manner so as to contiguously coat the plurality of nanowires of the free-standing metal foam, thereby increasing a nanowire diameter of each of the plurality of nanowires and intersection areas of the free-standing metal foam from interior surfaces to exterior surfaces of the free-standing metal foam, and forming a plurality of nucleation-derived granular surface features having sizes between approximately 0.1 μm and 5 μm, resulting in thickening of the free-standing metal foam around individual nanowires of the plurality of nanowires, as well as at intersections of multiple nanowires of the plurality of nanowires, wherein a contact area at the intersections is increased by over an order of magnitude, thereby forming a mechanically reinforced three-dimensional scaffold that exhibits enhanced mechanical stability and enables the free-standing metal foam to have a yield strength of at least 1 kg load over 120 mg of the free-standing metal foam while retaining an open porous structure with a tunable density from 1% to 30% of bulk density.

2. The method of claim 1, wherein the second electrolyte solution is different than the first electrolyte solution.

3. The method of claim 1, further comprising: sintering the free-standing metal foam prior to said further electrochemically depositing.

4. The method of claim 3, further comprising: during said sintering, performing multiple oxidation/reduction cycles upon the free-standing metal foam.

5. The method of claim 4, wherein each said oxidation/reduction cycle comprises:
   exposing the free-standing metal foam to air; and
   reducing the free-standing metal foam using a forming gas.

6. The method of claim 1, wherein said further electrochemically depositing results in an increase in the final foam density of the free-standing metal foam.

7. The method of claim 1, further comprising: coating at least a portion of the free-standing metal foam with a material selected from the group of coatings consisting of a metal, carbon, an oxide, a nitride, a chloride, a hydride, a fluoride, an iodide, and an amine.

8. The method of claim 1, wherein the free-standing metal foam features a pore size gradient across a dimension of the metal foam, including a plurality of nanometer to micron scale pores.

9. The method of claim 1, wherein enhancing the free-standing metal foam's mechanical stability comprises enabling it to support a load mass of at least one thousand times a mass of the free-standing metal foam without collapsing.

* * * * *